Nov. 13, 1928.

H. D. MATTHEWS 1,691,247

MEANS FOR MEASURING TEMPERATURE

Filed Sept. 24, 1926

WITNESSES:
E. A. McCloskey.
H. M. Biebel

INVENTOR
Howard D. Matthews.
BY
Merley G. Barr
ATTORNEY

Patented Nov. 13, 1928.

1,691,247

UNITED STATES PATENT OFFICE.

HOWARD D. MATTHEWS, OF MANSFIELD, OHIO, ASSIGNOR TO WESTINGHOUSE ELECTRIC & MANUFACTURING COMPANY, A CORPORATION OF PENNSYLVANIA.

MEANS FOR MEASURING TEMPERATURE.

Application filed September 24, 1926. Serial No. 137,482.

My invention relates to means for measuring temperature, and particularly to means for measuring the average temperature of an unequally heated surface of an apparatus.

An object of my invention is to provide a simple, efficient and inexpensive means for measuring temperature.

Another object of my invention is to provide means for integrating temperatures of different parts or divisions of an unequally heated surface of an apparatus.

Other objects of my invention will be obvious from the disclosure.

It may happen that the surface of a device, such as an electric sad iron, is heated unequally when the device is connected to an energizing source. If a temperature-indicating device is applied to said surface at one point only for the purpose of ascertaining the temperature of the same, it may not give the true or average temperature of the surface on account of the fact that the surface is unequally heated.

I overcome this difficulty in the present embodiment of my invention by providing a heat-conducting plate that is adapted to be placed in intimate contact with the surface the temperaure of which is to be measured. A thermo-couple is placed in heat conducting relation with the plate and is electrically connected to a voltage-indicating device.

Figure 1:
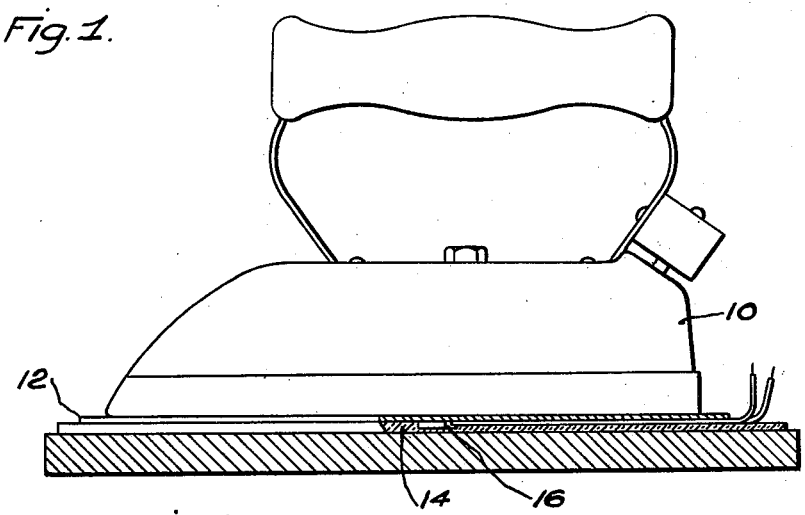
Figure 2:
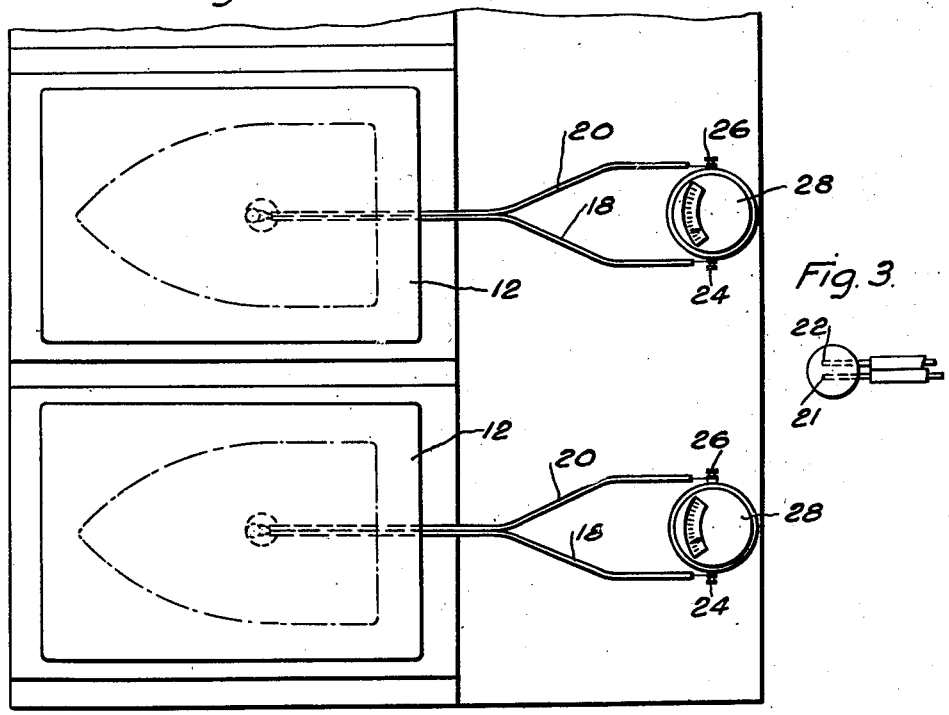

In the drawing, Fig. 1 is an elevational view, partially in section, of a sad iron applied to an embodiment of my invention, Fig. 2 is a plan view of a plurality of units similar to the unit shown in Fig. 1 each unit being electrically connected to a voltage-indicating device.

Fig. 3 is a detail view of the thermo-couple utilized in my temperature-measuring device.

Referring to the drawing, an electrically heated sad iron 10 rests on the copper plate 12 of my temperature measuring device. The copper plate 12 is preferably provided with a base 14 that is composed of heat-insulating material. A thermo-couple 16 is embedded in the base 14 and is thermally connected to the copper plate 12. The thermo-couple 16 may be positioned near the center of the plate, and, in order to insure a good thermal contact with the plate, it may be welded thereto.

Conductors 18 and 20 are electrically connected to the metals 21 and 22 comprising the thermo-couple. The other ends of conductors 18 and 20 are electrically connected to terminals 24 and 26, respectively, of a suitable voltage-indicating device, such as a volt meter 28.

When the iron 10 is heated and placed on the plate 12, as shown in Fig. 1, the heat from the various portions of the surface of the iron that is in contact with the plate 12 will be conducted by the copper plate to the thermo-couple 16. The heat of the thermo-couple 16 will cause a difference of potential between the conductors 20 and 18, thus causing a current to pass through the instrument 28. The voltmeter will indicate the difference of potential existing between the conductors 20 and 18 and this difference of potential will be proportional to the temperature of the thermo-couple, and, therefore, to the average temperature of the surface of the iron 10. The scale of the potentiometer 28 may, of course, be graduated to indicate the temperature of the sad iron in degrees.

It will be clear from the disclosure that the copper plate, being a good conductor, will readily conduct heat emitted from the various portions or divisions of the heated surface in contact therewith to the thermo-couple to give a summation of the temperatures of such portions; or, in other words, the temperature of the thermo-couple 16 will be the same as the average temperature of the surface of the iron 10.

In addition to its function of integrating the temperatures of the surface of the iron 10, or other heated surface that may be applied to it, the copper plate 12 acts to mechanically protect the thermo-couple 16 from injury. When a series of these heat-measuring devices are placed side-by-side, as shown in Fig. 2, they afford a desirable means for measuring, at definite intervals, the average temperature of the surface of a device that is passing through a heat cycle.

Of course, heat-integrating means other than the copper plate 12 might be used. Also, it is obvious that other indicating means may be used.

While I have shown and described, for purposes of illustration, a particular form of my invention, it may, of course, be embodied in other forms without departing from the spirit and scope thereof, as set forth in the appended claims.

I claim as my invention:

1. A device for indicating the summation of temperatures of surface divisions comprising, in combination, a copper plate adapted to support the surface to be measured and to make contact with substantially all points of said surface, an insulating base for supporting said copper plate, a thermo-couple embedded in the insulating base and welded to said copper plate, and a voltmeter electrically connected to said thermo-couple.

2. In a device for measuring the summation of temperatures of surface divisions, in combination, a heat-conducting plate adapted to make contact with the surface and to receive heat from substantially the entire surface, an insulating base for supporting said plate, a thermo-couple embedded in the insulating base and joined to said plate, and an electro-responsive device connected to said thermo-couple.

In testimony whereof, I have hereunto subscribed my name this 18 day of Sept., 1926.

HOWARD D. MATTHEWS.